Dec. 11, 1962 J. D. SMITH 3,067,842
DUAL CONTROL SAFETY BRAKE
Filed March 14, 1961 3 Sheets-Sheet 1
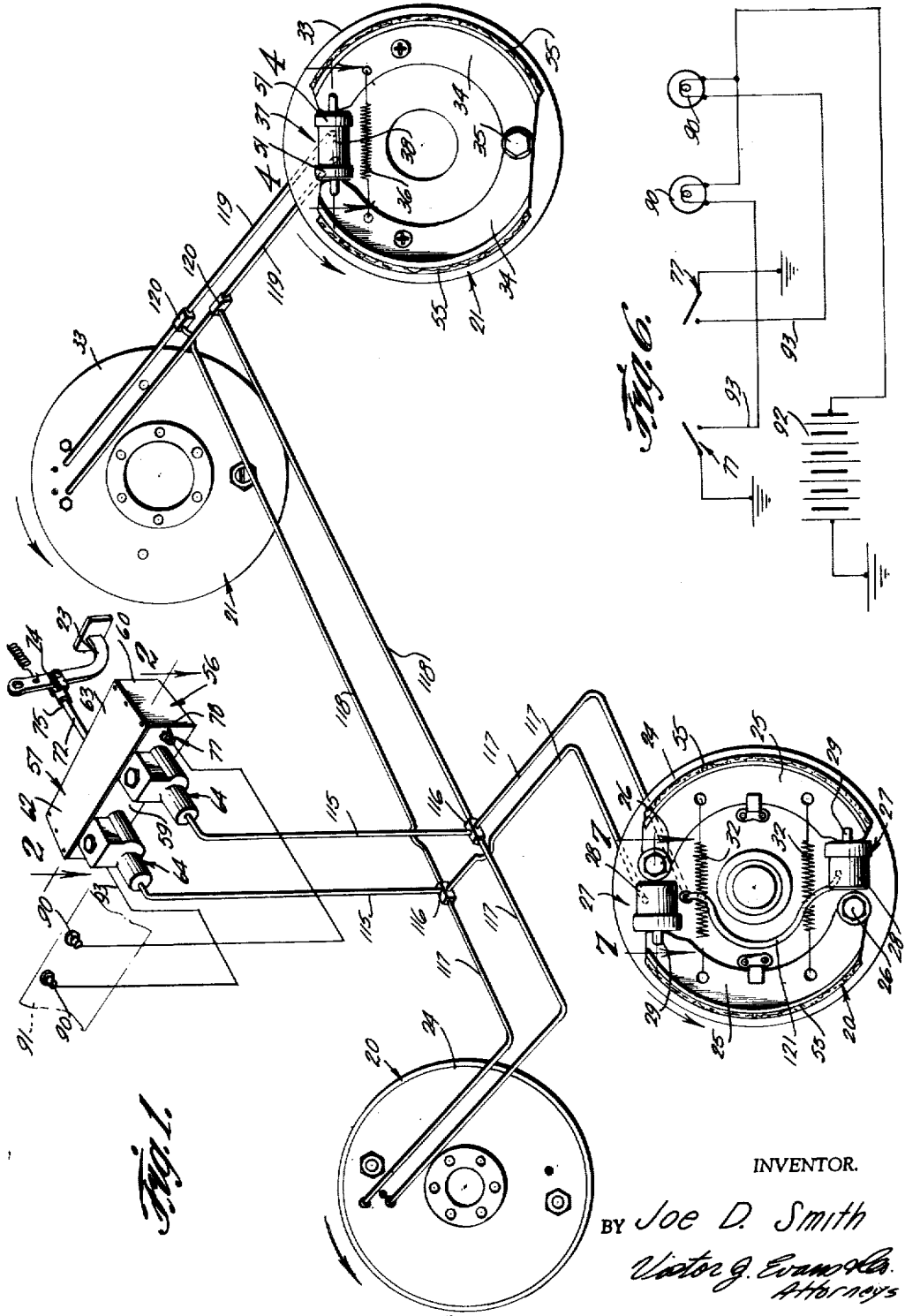
INVENTOR.
BY Joe D. Smith
Victor J. Evans &co.
Attorneys

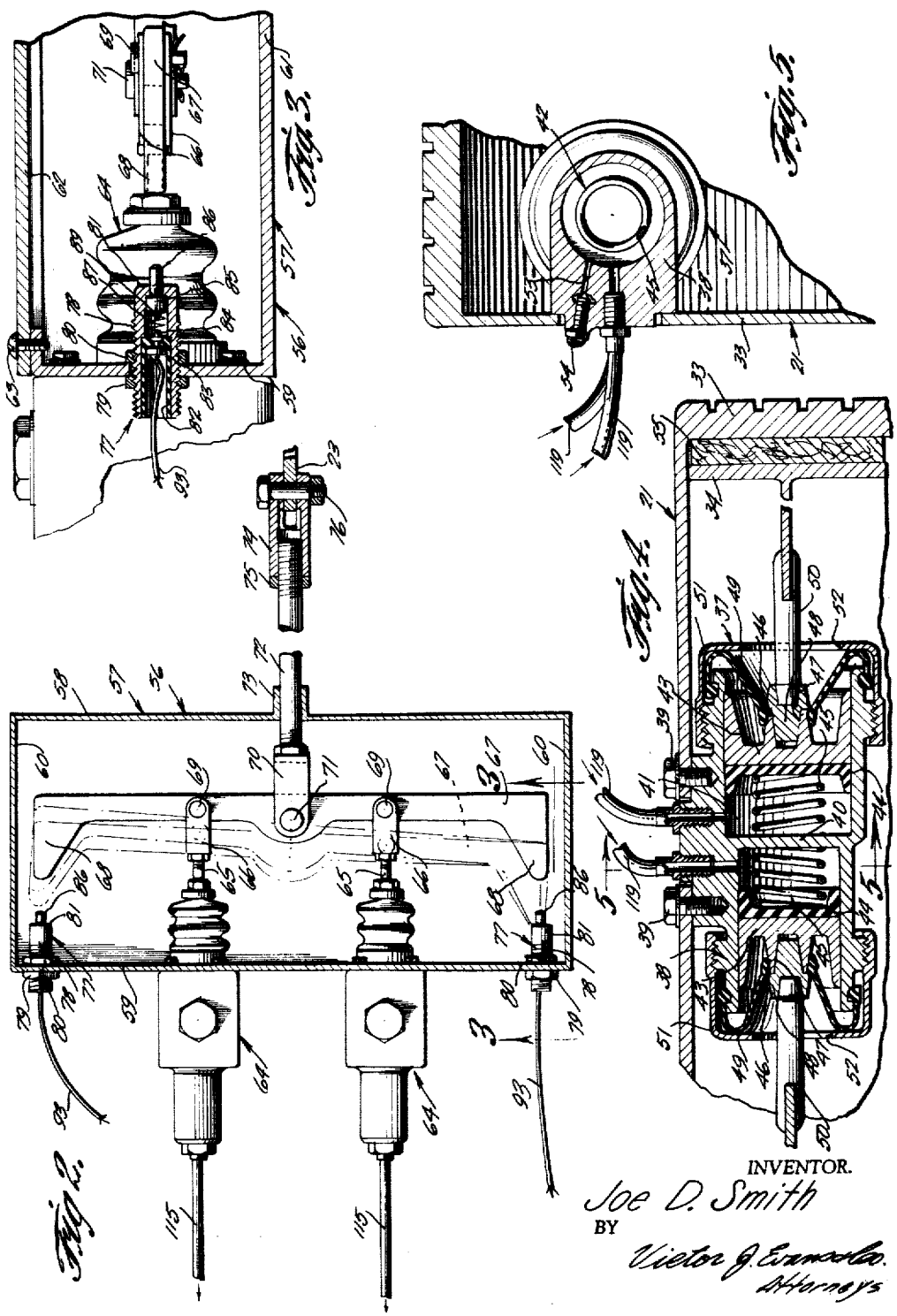

Dec. 11, 1962 J. D. SMITH 3,067,842
DUAL CONTROL SAFETY BRAKE
Filed March 14, 1961 3 Sheets-Sheet 3
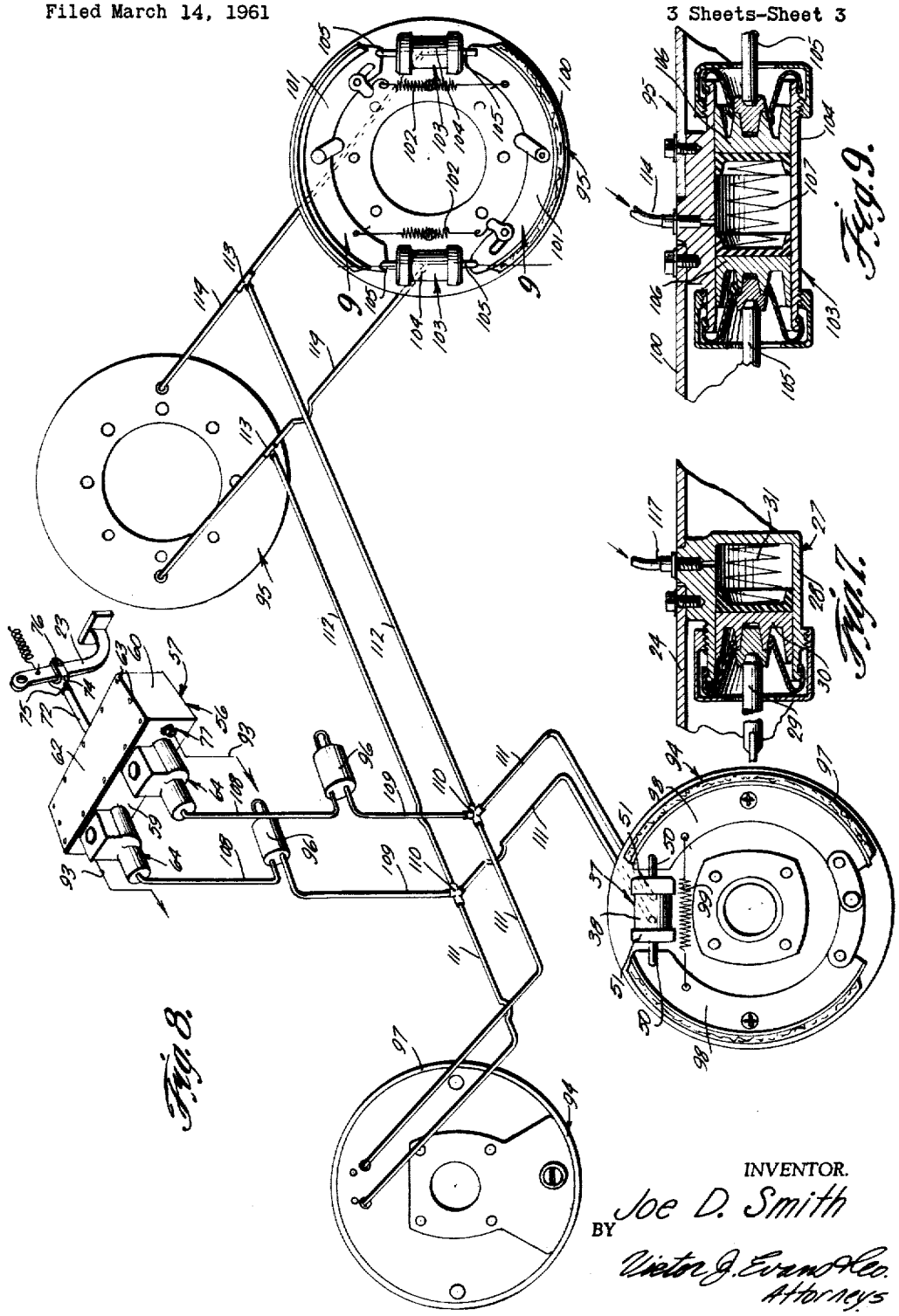
INVENTOR.
Joe D. Smith
BY
Victor J. Evans & Co.
Attorneys United States Patent Office 3,067,842
Patented Dec. 11, 1962

3,067,842
DUAL CONTROL SAFETY BRAKE
Joe D. Smith, Norton, Va., assignor of thirty-three and one-third percent to Cossie E. Adkins, Northeast, Norton, Va.
Filed Mar. 14, 1961, Ser. No. 95,590
2 Claims. (Cl. 188—152)

The present invention relates to a vehicle, and more particularly to a hydraulic brake system or mechanism for a vehicle.

The object of the invention is to provide a safety mechanism for a hydraulic brake system of a vehicle whereby in the event of a break or failure in a particular part of the hydraulic brake system, the remaining portion of the hydraulic brake mechanism will continue to function or operate so that the vehicle can be safely stopped even though one portion of the brake system may have a rupture therein.

Another object of the present invention is to provide a safety mechanism for a vehicle hydraulic brake system wherein a dual control mechanism is provided so that in the event one part of the hydraulic brake system fails to properly function, then the remaining part or portion can function to permit the vehicle to stop as desired or required.

Another object is to provide a dual control safety brake mechanism of the character described that will also provide an indication to the operator or driver of the vehicle when a break has occurred in the hydraulic brake system, and wherein the warning signal of the present invention will also serve to indicate to the driver of the vehicle when the brakes need adjustment or repair.

Another object is to provide a safety mechanism for a hydraulic brake system for a vehicle such as automobiles, trucks or the like, wherein according to the present invention two separate systems are provided which are adapted to either function together or independently of each other so that in the event that a wheel cylinder or other element blows out, then the brakes of the vehicle can still be operated so as to stop the vehicle, and wherein the present invention also serves to warn the operator of the vehicle when there is a leak in the hydraulic system, or when the fluid level in the master cylinder reservoir is low, or when there is excessive travel in the wheel cylinders indicating that the brakes need adjusting or relining.

Another object is to provide apparatus of the character described that is economical to produce, durable in form, and conducive to the most economical use of materials and uniformity of members formed therefrom.

Another object of the present invention is to provide an equalizer beam pivotally connected to the brake pedal rod and pivotally connected to the rods of the plural master cylinders, the equalizer beam being so constructed as to extend beyond said master cylinder rods.

A further object of the present invention is to provide a plural hydraulic system with each of said master cylinders being connected by a conduit to one actuating cylinder or to one side of an actuating cylinder in each unit of the hydraulic system so that in the event of either of the master cylinders being inoperative there will still be an actuating cylinder working in each unit of the system through increased leverage from said equalizer beam.

A still further object of the present invention is to provide a threaded cap or cover over the end or ends of the actuating or wheel cylinders with an opening in the end of said cap or cover for the actuating rods to travel through, this being to prevent the actuating cylinder piston from blowing out in the event a wheel or drum or both should fall off.

Still further objects and advantages will become apparent in the subsequent description in the specification.

In the drawings:

FIG. 1 is a schematic view illustrating the present invention.

FIG. 2 is an enlarged sectional view taken on the line 2—2 of FIG. 1.

FIG. 3 is a sectional view taken on the line 3—3 of FIG. 2.

FIG. 4 is an enlarged sectional view taken on the line 4—4 of FIG. 1.

FIG. 5 is a sectional view taken on the line 5—5 of FIG. 4.

FIG. 6 is a schematic view illustrating the wiring diagram for the present invention.

FIG. 7 is a sectional view taken generally on the line 7—7 of FIG. 1.

FIG. 8 is a schematic view illustrating a modification.

FIG. 9 is a sectional view on an enlarged scale taken generally on the line 9—9 of FIG. 8.

Referring in detail to the drawings, and more particularly to FIGS. 1 through 7 of the drawings, there is illustrated a vehicle hydraulic brake system which is shown to comprise a pair of spaced apart front wheel assemblies which are each indicated generally by the numeral 20, and there is further provided a pair of spaced apart rear wheel assemblies that are each indicated generally by the numeral 21. The numeral 56 indicates an equalizer which is provided and constructed for a purpose to be later described in this application, and in FIG. 1 the numeral 23 indicates the usual brake pedal of a vehicle such as an automobile.

As shown in FIG. 1 for example, each of the front wheel assemblies 20 embodies a drum 24 which has the usual brake shoes 25 pivotally mounted therein, and the numeral 26 designates the pivot pins for the shoes 25. Each of the front wheel assemblies 20 further includes a wheel cylinder which is indicated generally by the numeral 27, and each of the wheel cylinders 27 embodies a casing or barrel 28 which has a piston rod 29 extending outwardly from an end thereof, FIG. 7, and the inner end of the rod 29 is suitably affixed to a piston 30 that is movable in the barrel 28, there being a coil spring 31 arranged contiguous to the piston 30. The numeral 32 indicates return springs for the front wheel assembly 20.

As shown in the drawings each of the rear wheel assemblies 21 includes a drum 33 which has a pair of arcuate brake shoes 34 pivotally supported therein as at 35, and the numeral 36 indicates a return spring for the shoes 34. Each rear wheel assembly 21 is further provided with a double wheel cylinder that is indicated generally by the numeral 37, and in FIG. 4 there is illustrated a fragmentary sectional view of one of the double wheel cylinders 37 where it will be seen that each wheel assembly 37 includes a body member or barrel 38 which is adapted to be secured or affixed to the brake drum 33 as for example by means of securing elements 39. The numeral 40 indicates a partition or wall that is arranged within the intermediate portion of the body member 38, and there is defined within the body member 38 on opposite sides of the partition 40 spaced apart separate compartments or chambers which are indicated by the numerals 41, 42. A piston 43 is slidable in each of these compartments 41 and 42, and a packing cup 44 is arranged contiguous to the inner surface of each piston 43, there being a coil spring 45 abutting the cup 44. The outer central portion of each piston 43 is provided with a recessed shoulder 46 that provides a seat 47 for fitting 48, and piston rods 50 are connected to the fittings 48 as shown in the drawings, the numeral 49 indicating a resilient or yieldable cover for each end of the wheel cylinder. An end piece 51 is arranged in threaded engagement with an end portion of the body member 38, and the end piece 51 is provided with an opening 52 therein for the projection therethrough of a corresponding piston rod 50.

Referring to FIG. 5 of the drawings, the numeral 53 designates bleeder openings or ports, and the bleeder openings 53 are adapted to communicate with the compartments 41 and 42, and plugs 54 are provided for selectively closing the ports or openings 53.

In FIG. 4 the numeral 55 indicates the usual lining for the brake shoes.

According to the present invention there is further provided an equalizer which is indicated generally by the numeral 56, and the equalizer 56 embodies or comprises a hollow housing that is indicated by the numeral 57, the housing 57 comprising spaced parallel walls 58 and 59, as well as a pair of spaced parallel wall members 60, and the housing 57 further includes a bottom portion 61 as well as a lid or cover 62 that may be fastened in place as at 63.

The equalizer 56 is further provided with a pair of separate master cylinders which are each indicated generally by the numeral 64, and extending from an end of each master cylinder 64 is a movable rod 65, there being a bracket 66 affixed to each of the actuating rods 65, and the brackets 66 are pivotally connected to a beam or bar 67 by means of pivot pins 69. There is provided on the ends of the beams 67 a pair of spaced apart lugs or shoulders 68, FIG. 2.

The numeral 70 indicates a bracket or yoke which is pivotally connected to the intermediate portions of the beam 67 by means of a pivot pin 71, and a rod 72 is slidable in a projection or fitting 73 on the wall 58 of the housing 57, and the rod 72 is affixed to or secured to the yoke 70. The rod 72 has a bracket 74 connected to its other end, and a nut or retainer 75 is arranged on the rod 72 contiguous to the bracket 74, the bracket 74 being pivotally connected to the brake pedal 23 as at 76.

Arranged in the end portions of the housing 57 are spaced apart combined stop and switches 77, and each of the combined stop and switches 77 has the same construction and each comprises a support member 78 that is suitably affixed in the wall 59 of the housing 57 as for example by means of lock nuts 79 and 80, and the inner end of the support member 78 is indicated by the numeral 81. Mounted within the support member 78 is an insulated bushing 82, and the numeral 83 indicates a base piece that is firmly anchored within the bushing 82, there being a terminal 84 extending from the base piece 83. The numeral 85 indicates a plunger that is slidable in the support member 78, and the plunger 85 is provided with a stem 86 which extends through a suitable aperture or opening in the end portion 81 of the support member 78, there being a terminal 89 extending from the plunger 85, and the terminal or contact 89 being mounted for movement into and out of electrical engagement with the contact 84 on the base piece 83. The numeral 87 indicates a coil spring which is interposed between the plunger 85 and the adjacent end portion of the bushing 82. The stem portion 86 of the plunger 85 is adapted to be selectively engaged by a corresponding lug 68 of the beam 67 as subsequently described in this specification.

In FIG. 6 there is illustrated schematically the wiring diagram of the present invention and it will be noted that the numeral 90 indicates signal lights or warning signals that are adapted to be arranged in a convenient location such as on the dash 91 of the vehicle, and the numerical 92 in FIG. 6 indicates the usual source of electrical energy such as the vehicle battery, and the electrical circuit includes wires or conductors 93 which are electrically connected to the base pieces 83 of the combined stop and switch 77 so that the warning lights 90 can be selectively energized or actuated.

Attention is now directed to FIGS. 8 and 9 of the drawings and wherein there is illustrated a modified hydraulic brake system as for example for use with a vehicle such as a truck, and in FIG. 8 the numeral 94 designates each of a pair of spaced apart front wheel assemblies, while the numeral 95 designates each of a pair of rear wheel assemblies, and the hydraulic brake system of FIG. 8 may include the vacuum boosters 96.

Each of the front wheel assemblies 94 is shown to comprise a brake drum 97 which has shoes 98 movably arranged therein, and a return spring 99 is provided for the shoes 98, and there is provided a double wheel cylinder 37 for each of the front wheel assemblies 94. The double wheel cylinder 37 has a construction generally the same as previously described.

The rear wheel assemblies 95 each include a drum 100 as well as a pair of arcuate shoes 101 which have return springs 102 connected thereto, and wheel cylinders 103 are arranged as shown in FIG. 8, it being noted that there is a pair of wheel cylinders 103 for each wheel assembly 95. As shown in FIG. 9 each of the wheel cylinders 103 comprises a barrel or casing 104, and movable piston rods 105 extend from opposite ends of the barrel 104, and these rods 105 are adapted to be suitably affixed to pistons 106 that are movable in the barrel 104, there being a coil spring 107 interposed between the pistons 106.

As shown in FIG. 8 hoses or conduits 108 are connected to the pair of master cylinders 64, and these conduits 108 are adapted to be connected to the vacuum boosters 96 when such vacuum boosters are used, and conduits 109 connect the boosters 96 to fittings 110. Hoses or lines or conduits 111 serve to connect the fittings 110 to the compartments 41 and 42 of the wheel cylinders 37. There is further provided hoses or conduits 112 which connect the fittings 110 to lines or conduits 114 through the medium of fittings 113, and the conduits 114 are connected to the wheel cylinders 103.

In the arrangement of FIG. 1, it will be noted that conduits such as the conduits or lines 115 serve to connect the master cylinders 64 of the equalizer 56 to fittings 116, and conduits or lines 117 connect the fittings 116 to the wheel cylinders 27 for the front wheel assemblies 20. Lines or hoses 118 serve to connect the fittings 116 to lines or conduits 119 through the medium of fittings 120, and the conduits 119 are connected to the spaced apart compartments 41, 42 of the double wheel cylinders 37 for the rear wheel assemblies 21.

From the foregoing, it will be noted that there has been provided a safety brake mechanism for use with a vehicle such as an automobile, truck, bus or the like, and in use with the parts arranged as shown in FIGS. 1 through 7 for example, it will be seen that as long as the vehicle brakes are functioning all right and in their normal manner, that when foot pressure is applied to the brake pedal 23, the rod 72 will be pushed inwardly as for example from right to left in FIG. 2 so that the rod 72 will move inwardly with respect to the housing 57 of the equalizer 56. As the rod 72 moves inwardly and with the hydraulic brakes functioning in their normal manner, the beam 67 will be moved from right to left in FIG. 2 for example, and this is because the beam 67 is connected to the bracket 70 by means of the pivot pin 71, and the bracket 70 is suitably affixed to the inner end of the rod 72. This movement of the beam or bar 67 will serve to normally actuate both of the master cylinder 64 since the rods 65 of the master cylinder 64 are connected as at 66 and 69 to side portions of the beam 67, so that as the rods 65 are moved inwardly due to the application of foot pressure to the brake pedal 23, it will be seen that there will be a buildup or increase in hydraulic fluid pressure in the various conduits or hoses, as for example the increase in hydraulic fluid pressure will be transmitted from the master cylinder 64 through the conduits 115, and to the fitting 116, and from the fittings 116 to the conduits 117 and 18, and the pressure from the conduits 118 can be transmitted through fittings such as fittings 20 to the conduits or lines 119.

As shown in FIG. 1 each of the front wheel assemblies 20 has a similar has a similar construction, and each of the rear wheels 21 has a similar construction or operation, and as previously stated when the foot brake 23 is depressed, hydraulic fluid pressure will be transmitted to the various wheel cylinders of the front and rear wheel assemblies. For example fluid pressure will be transmitted through the conduit 117 to the front wheel cylinders 27, and a branch line or conduit 121 may be used for conveying the hydraulic fluid to the lower wheel cylinder 27. As the fluid pressure is introduced into the barrel 28 of each of the pair of wheel cylinders 27 for each front wheel assembly, the piston 30 will be urged or biased outwardly against the tension of the coil spring 31 so as to move the piston rod 29 outwardly, and since the piston rods 29 are suitably connected to the brake shoes 25, it will be seen that this will result in outward pivotal movement of the brake shoes 25 so that the brake linings will move into engagement with the brake drums to help stop the vehicle.

At the same time, hydraulic fluid will be supplied to the double wheel cylinders 37 for the rear wheel assemblies 21, and as shown in FIG. 4 for example, each of the double wheel assemblies 37 includes a pair of separate compartments 41 and 42 which are arranged on opposite sides of a partition 40, and when all parts of the hydraulic brake system are properly functioning, the hydraulic fluid will be introduced into the compartments 41 and 42 through the pair of lines or conduits 119 and this will cause the pair of pistons 43 to be moved outwardly whereby both piston rods 50 will be urged outwardly in order to simultaneously actuate both brake shoes 34 so that the brakes will normally be applied to all four wheels 20 and 21 simultaneously.

With the parts arranged as shown, it will be seen that in the event that a break or rupture or leak occurs in any one part of the hydraulic brake system, then the brakes can still be applied since in effect there are two separate systems or dual brake systems which can either operate in conjunction with each other simultaneously, or else each of the pair of separate systems can operate or function independently of the other. For example if a rupture or leak occurs in one of the wheel cylinders, such a wheel cylinder 27, then the wheel cylinder in the other wheel assembly can continue to function since these wheel cylinders each are separately connected to their own master cylinder 64 through the previously described conduits. As shown by broken lines in FIG. 2 for example, when a leak or break occurs in the conduit 115 shown in the lower portion of FIG. 2, or in any of the accessories connected to this particular conduit, then the fluid will be lost or reduced in this part of the hydraulic brake system and in the corresponding master cylinder 64 so that when the foot pedal 23 is depressed, since there will be less resistance from the hydraulic fluid in this part of the system, the beam 67 will have a tendency to pivot on its pivot pin 71 as for example in a generally clockwise direction, FIG. 2, and this will result in the lug 68 shown in the lower portion of FIG. 2 moving into engagement with the adjacent combined stop and switch 77 so that an electrical circuit will be completed to one of the warning lights 90 which are arranged on the dashboard 91 of the vehicle whereby the driver of the vehicle will know that a leak or trouble has occurred whereby the necessary corrective action can be taken. However, even though such a leak has occurred in one half of the system, the other half or portion of the system will continue to operate so that the brakes can be applied. That is, even though the bar 67 has pivoted or moved on its axis or pin 71, nevertheless as the rod 72 moves inwardly into the housing 57 due to foot pressure on the pedal 23, the other or uppermost master cylinder 64 shown in FIG. 2 will be actuated so that hydraulic fluid will be provided from this last named master cylinder in order to properly actuate the necessary wheel cylinders to stop the vehicle.

In addition, the present invention will also provide a visual signal or warning to the operator of the vehicle as for example when the brake fluid needs replenishing, or when the brakes need adjusting, and this is because when the brake shoes or linings become worn, or when the hydraulic fluid level is decreased, when foot pressure is applied to the brake pedal 23, the rod 72 will move inwardly into the housing 57 and under such conditions both rods 65 will move inwardly more than their usual distance so that both of the lugs 68 on the beam 67 will simultaneously contact the pair of combined stop and switches 77 in order to energize both of the warning lights 90 whereby the driver will know that it is time to correct the fault in the brakes. Instead of using a visual signal such as a warning light, an audible signal may be utilized, or a combination of a visual and audible signal can be provided.

In the modification of FIGS. 8 and 9, which modification may be used for a truck or the like, the operation is generally the same as described in connection with the arrangement of FIG. 1, so that for example with the parts arranged as shown in FIG. 8 when the vehicle brakes are properly functioning or operating, when foot pressure is applied to the foot pedal 23, both master cylinders 64 will simultaneously be actuated so that the double wheel cylinder 37 for each front wheel assembly 94 will be actuated in order to simultaneously actuate all of the brake shoes in the front wheel assemblies. In addition at the same time both wheel assemblies 103 for each of the rear wheel assemblies 95 will be simultaneously actuated so that all of the vehicle wheel brakes will be simultaneously applied. If a leak or break occurs in any part of the system of FIG. 8, the other or separate part will continue to function independently of the part in which the leak has occurred so that the vehicle can be stopped. The wheel cylinders 37 are of the type shown in FIG. 4 so that normally when the brakes are applied both piston rods 50 will be simultaneously urged outwardly to move the brake shoes 98 of each front wheel assembly 94. If a leak or break occurs in one of the chambers 41 or 42, the other chamber will continue to permit its piston rod 50 to be moved in the necessary manner to actuate the brake shoe and stop the vehicle. Similarly, when the truck or vehicle is being stopped and with the brakes properly functioning, application of foot pressure to the pedal 23 will result in hydraulic pressure being transmitted to each of the pair of wheel cylinders 103 for each rear wheel assembly 95 so that as for example as shown in FIG. 9 the pistons 106 can be urged outwardly to push the rods 105 outwardly whereby the brake shoes 101 will have their linings apply the braking action to the brake drums. If a leak occurs in one part of the system, it will be seen that the other part which is not affected can continue to function in the necessary manner. Suitable warning lights which are actuated by the combined stop and switches 77 are provided for the equalizer 56 in the arrangement of FIG. 8 in the same manner as previously described in connection with the arrangement of FIG. 1.

There is further provided stop means for limiting movement of certain of the parts, and for example as the beam 67 moves from right to left in FIG. 2, the lugs 68 can engage the end portion or stop 81 of the support member 78 so as to help limit further travel or movement of the beam 67 and its associated parts. In addition as the rod 72 moves inwardly with respect to the housing 57, the fastener 75 can abut or engage the projection 73 on the housing 57 so as to provide a further limit stop for the equalizer.

The warning lights 90 are arranged as shown in FIG. 6 so that the driver of the vehicle can note which of the pair of warning lights 90 is on whereby the driver can tell exactly which portion or side of the hydraulic system is malfunctioning.

As shown in FIG. 5 the plugs 54 can be unscrewed or removed so as to permit the openings or ports 53 to be used for bleeding the hydraulic brakes.

It is to be noted that the wheel cylinder 37 shown in detail in FIG. 4 includes two generally similar chambers which each have a slidable piston 43 therein, and there is provided adjacent the outer ends of the wheel cylinder 37, flexible or yieldable members 49 which help prevent dust or other foreign matter from entering the interior of the wheel cylinder. Also, there is provided the end pieces 51 which are cut away or provided with the openings 52, and these openings 52 provide sufficient clearance for the piston rods 50 which extend from opposite ends of the wheel cylinder.

The wheel assemblies are provided with the usual accessories such as return springs, brake linings and the like, and it is not thought necessary to describe in detail the construction and function of such conventional parts. In addition suitable materials can be used for making the various elements or parts, and such parts can be of a required or suitable shape or size as desired or required.

It will be seen that with the parts arranged as shown in the drawings, when a leak or break happens in a portion of the system, that master cylinder 64 connected with that portion of the system will have its actuating rod 65 move in a greater distance than the actuating rod 65 of the other master cylinders so that the combined stop and switch 77 contiguous to the affected master cylinder will cause a corresponding light 90 to light up when the shoulder 68 engages the projecting stem portion or actuator 86 of the element 85 since this will cause the element 85 to be pushed inwardly until its contact 89 electrically engages the terminal or contact 84 so as to complete the electrical circuit as shown in FIG. 6. When the shoulder moves away from the stem portion 86, the spring 87 will return the parts to the position shown in FIG. 3 so that the circuit will be open and the light will go off.

According to the present invention there is provided a safety hydraulic brake system for automobiles, trucks or other vehicles and wherein there is provided two separate systems which work together as one or which work completely independent of each other. For example if a wheel cylinder blows out, or if a brake line or hose ruptures, or a master cylinder becomes defective, the vehicle will still have brakes. In the event a front or rear wheel should come off with the result of a broken spindle or axle, the wheel cylinder will not blow out to cause a loss of brakes. The brakes will continue to function properly on the remaining wheels and the vehicle can be stopped. In addition the present invention also warns the operator of a vehicle when there is a leak in the hydraulic system or when the fluid level in the master cylinder reservoir is low, or when there is excessive travel in the wheel cylinders indicating that the brakes need adjusting or relining.

As shown in the drawings there is provided the brake pedal pressure equalizer which is indicated generally by the numeral 56 and this permits the two hydraulic master cylinders 64 to work together as one cylinder or independently of each other regardless of the free travel of either master cylinder, and also regardless of any uneven brake lining wear. The equalizer can be installed on vehicles of all sizes and types with power brakes or vacuum boosters, and the side of the master cylinder and the weight and dimensions of the material can be suitably determined depending upon the size and requirements of the vehicle. The master cylinder barrel diameter is adapted to be reduced since it is supplying fluid to only one half of the wheel cylinders as shown in the drawings. When pressure is applied to the brake pedal such as the brake pedal 23, the brake pedal rod 72 travel through the bushing 73 that is mounted on the equalizer housing 57, and the rod 72 is connected by a clevis or bracket to the equalizer beam 67. The master cylinders 64 are attached to the equalizer beam 67 by the brackets 66 and this construction permits an equal amount of pressure to be applied to the master cylinder at the same time when the brake system is properly functioning. In the event one line loses pressure upon the brake application or while the brakes are applied as for example resulting from a ruptured whel cylinder, broken line or hose, or a faulty master cylinder, the master cylinder on the side of the broken line will have its inner piston and rod 65 travel forward until the end of equalizer beam comes in contact with the brake warning combined stop and switch 77, and leverage is applied so as to permit pressure to be applied to the other side and the other master cylinder which permits the brakes to be applied, and also the warning signal will be energized each time the brake is applied indicating that a master cylinder is not working. The action will occur for either of the master cylinders and their associated parts. The brake warning lights mounted on the dashboard of a vehicle will also show when the brakes need adjusting. Thus, when the brake pedal within a predetermined distance such as a half inch of the limit of travel, the ends 68 of equalizer beam 67 will come in contact with the brake warning combined stop and switches 77 on both sides of the equalizer causing both lights 90 on the dashboard to come on each time the brakes are applied. When the warning switch makes contact, the equalizer beam has an end portion or lug portion 68 engage an end portion or stop 81 of a support member 78 which functions as to stop so as to cause the beam to act as leverage for pressure to the other master cylinder.

When pressure is applied to the brake pedal, the brake pedal moves the equalizer beam 67 in such a manner so as to insure that the same amount of pressure will be applied to both master cylinders at the same time which in turn creates the same amount of pressure in the lines 115 and their associated parts. Fluid in these lines or conduits builds up pressure in the wheel cylinders in the front and rear wheels of the vehicle, and if there is a loss of pressure in one master cylinder caused by a bad master cylinder, blown wheel cylinder, or broken lines, the other master cylinder will continue to properly function. The same action occurs if there is a loss of pressure in the other parts shown. The brake warning lights will indicate which master cylinder is not working. The front wheels may have single action double wheel cylinders with a separate line to each cylinder and an eccentric anchor for each brake shoe. The rear wheels may have a single cylinder which is divided as shown in FIG. 4 and wherein there is a separate line and bleeder screw for each side. The rear wheels may have either a single or double eccentric anchor, and both front and rear wheel cylinders are adapted to have the ends of the cylinder bodies threaded with metal caps 51 which can be threaded on to prevent the wheel cylinders from blowing out in the event that the wheel should come off.

As shown in FIG. 8 the present invention can be used on trucks, and a separate booster can be used for each cylinder, or one boster can be used with a separate control valve and slave for both cylinders. The front wheel cylinders for the arrangement of FIG. 8 may be a single cylinder body divided with a separate line and bleeder screw to each side with a single or double eccentric anchor, or it may be a single action double wheel cylinder. The rear wheels may be high torque self centering with two double acting cylinders connected by seperate lines to the master cylinders 64.

Manor changes in shape, size and rearrangement of details coming within the field of invention claimed may be resorted to in actual practice, if desired.

What is claimed is:

1. In a hydraulic brake system, a pair of master cylinders adapted to be connected to a dual brake system, a housing, said master cylinders being fixedly mounted in said housing with operating rods extending from said cylinders, a beam within said housing pivotally connected to said rods, a pedal rod pivotally connected to said beam between said first mentioned pivotal connections, stop means mounted on said housing adjacent each end of said beam and on opposite sides of said beam from said pedal rod, the stop means being so related to said beam so that the beam will pivot on one of said stop means upon failure of one system of said dual brake system.

2. The hydraulic brake system as recited in claim 1, wherein said stop is a combined stop and switch, said switch being adapted to operate a signal when contacted by said beam.

References Cited in the file of this patent

UNITED STATES PATENTS

| 2,060,875 | LaBrie | Nov. 17, 1936 |
| 2,195,558 | Bowen | Apr. 2, 1940 |
| 2,324,007 | MacPherson | July 13, 1943 |
| 2,566,874 | Crotts | Sept. 4, 1951 |
| 2,857,584 | Gibson | Oct. 21, 1958 |

FOREIGN PATENTS

| 877,742 | France | Sept. 14, 1942 |